(12) United States Patent
Kowalik et al.

(10) Patent No.: US 10,055,610 B2
(45) Date of Patent: *Aug. 21, 2018

(54) PERSONAL CONTENT CONTROL ON MEDIA DEVICE USING MOBILE USER DEVICE

(71) Applicant: Google LLC, Mountain View, CA (US)

(72) Inventors: Lukasz Kowalik, Cracow (PL); Marcin Stanislaw Wielgus, Cracow (PL)

(73) Assignee: Google LLC, Mountain View, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 15/000,358

(22) Filed: Jan. 19, 2016

(65) Prior Publication Data

US 2017/0206375 A1    Jul. 20, 2017

Related U.S. Application Data

(63) Continuation of application No. 14/528,923, filed on Oct. 30, 2014, now Pat. No. 9,251,370, which is a continuation of application No. 13/406,457, filed on Feb. 27, 2012, now Pat. No. 8,898,743.

(51) Int. Cl.
*H04L 29/06* (2006.01)
*G06F 21/62* (2013.01)
*H04W 12/08* (2009.01)

(52) U.S. Cl.
CPC .......... *G06F 21/6245* (2013.01); *H04L 63/10* (2013.01); *H04L 63/102* (2013.01); *H04W 12/08* (2013.01)

(58) Field of Classification Search
CPC ............................. G06F 21/31; H04L 12/2812
See application file for complete search history.

(56) References Cited

U.S. PATENT DOCUMENTS

| | | | |
|---|---|---|---|
| 7,523,859 | B2 | 4/2009 | Patel et al. |
| 8,898,743 | B1 * | 11/2014 | Kowalik ............. G06F 3/04842 726/4 |
| 2008/0130524 | A1 | 6/2008 | Volach et al. |
| 2009/0150553 | A1 | 6/2009 | Collart et al. |
| 2009/0215539 | A1 | 8/2009 | Xidos et al. |

(Continued)

OTHER PUBLICATIONS

Notice of Allowance dated Feb. 27, 2012 in U.S. Appl. No. 13/406,457.

(Continued)

*Primary Examiner* — Jason K Gee
(74) *Attorney, Agent, or Firm* — Byrne Poh LLP

(57) ABSTRACT

A method for controlling personal content on a media device includes establishing, at the media device, a wireless connection with a mobile user device using a wireless communication circuit of the media device; receiving, from the mobile user device, account information for an account associated with personal content, the personal content of the account accessible by the media device from a server computer over a communication network or from a memory of the media device; receiving, from the mobile user device, a usage term for accessing or using the personal content of the account; and controlling access to or usage of the personal content of the account by the media device based on the received account information and the usage term.

21 Claims, 3 Drawing Sheets

(56) References Cited

U.S. PATENT DOCUMENTS

2011/0162048 A1  6/2011  Bilbrey et al.
2011/0236872 A1  9/2011  Taylor
2012/0136943 A1  5/2012  Paul et al.
2012/0324076 A1  12/2012  Zerr et al.
2013/0347025 A1  12/2013  Prakash et al.

OTHER PUBLICATIONS

Notice of Allowance dated Oct. 30, 2014 in U.S. Appl. No. 14/528,923.
Office Action dated Jan. 28, 2014 in U.S. Appl. No. 13/406,457.
Office Action dated Jun. 9, 2015 in U.S. Appl. No. 14/528,923.

* cited by examiner

PERSONAL CONTENT CONTROL ON MEDIA DEVICE USING MOBILE USER DEVICE

CROSS REFERENCE TO RELATED APPLICATIONS

This application is a continuation of U.S. patent application Ser. No. 14/528,923, filed on Oct. 30, 2014, which is a continuation of U.S. patent application Ser. No. 13/406,457, filed on Feb. 27, 2012, which are hereby incorporated by reference herein in their entireties.

TECHNICAL FIELD

The present disclosure relates generally to authentication or authorization and more particularly, to personal device based authentication or authorization in applications running on shared media devices.

BACKGROUND

Shared connected customer electronics devices like a television (TV), digital video recorder (DVR), a Blu-Ray player, or other set-top box may be running applications that require accessing personal content like user photos, e-mails, news, or personalized TV program recommendations.

Shared devices, by definition, are shared among multiple users (family or housemates). Therefore, one user's content may be exposed to other users leading to private information leaks and presenting inappropriate or wrong data. Therefore, mechanisms must be used to determine who is currently using the shared device. Moreover different users may/or may not want shared-device applications to use their accounts or only want the shared-device applications to use their accounts under certain conditions.

These mechanisms should not involve typing a password with every user change as this can happen very often with televisions. Televisions and many other shared devices usually do not have convenient keyboards and therefore typing complex passwords may be difficult. Because the shared devices are shared by many people who may watch the user's hands or the screen, typing the password can be risky.

SUMMARY OF THE DISCLOSURE

A method for controlling personal content on a media device includes (but is not limited to) any one or combination of: (i) establishing, at the media device, a wireless connection with a mobile user device using a wireless communication circuit of the media device; (ii) receiving, from the mobile user device, account information for an account associated with personal content, the personal content of the account accessible by the media device from a server computer over a communication network or from a memory of the media device; (iii) receiving, from the mobile user device, a usage term for accessing or using the personal content of the account, wherein the usage term specifies at least one rule for accessing or using the personal content of the account; and (iv) controlling access to or usage of the personal content of the account by the media device to the personal content of the account based on the received account information and the usage term.

In various implementations, the method further includes receiving, from the mobile user device, a request to terminate the wireless connection.

In various implementations, the media device is one of a television, a digital video recorder, a video game system, an optical disc player, and a media player for playing media on a television.

In various implementations, the media device comprises a smart TV module.

In various implementations, the mobile user device is one of a cell phone, a tablet, and a personal digital assistant.

In various implementations, the personal content comprises media content. In some implementations, the media content comprises at least one of video content, image content, and audio content.

In various implementations, the account is an account for a social network website.

In various implementations, the account is an account for a file-sharing website.

In various implementations, the account information for the account includes at least one of a user name and password for accessing the personal content of the account.

In various implementations, the account information for the account comprises includes one or more of authentication or authorization information for accessing the personal content of the account.

In various implementations, the usage term includes a confirmation to a usage term provided by the media device.

In various implementations, the method further includes receiving, from the mobile user device, a list of accounts for which the mobile user device has account information. In some implementations, the method further includes receiving account information for a selected account of the accounts in the list.

A computer program product for controlling personal content on a media device includes a computer-readable medium comprising code for (but is not limited to) any one or combination of: (i) establishing, at the media device, a wireless connection with a mobile user device using a wireless communication circuit of the media device; (ii) receiving, from the mobile user device, account information for an account associated with personal content, the personal content of the account accessible by the media device from a server computer over a communication network or a memory of the media device; (iii) receiving, from the mobile user device, a usage term for accessing or using the personal content of the account, the usage term specifying at least one rule for accessing or using the personal content of the account; and (iv) controlling access to or usage of the personal content of the account by the media device based on the received account information and the usage term.

A system for controlling personal content on a media device includes a processor. The processor is configured to establish a wireless connection with a mobile user device using a wireless communication circuit of the media device. The processor is configured to receive, from the mobile user device, account information for an account associated with personal content. The personal content of the account is accessible by the media device from a server computer over a communication network or from a memory of the media device. The processor is configured to receive, from the mobile user device, a usage term for accessing or using the personal content of the account. The usage term specifies at least one rule for accessing or using the personal content of the account. The processor is configured to control access to or usage of the personal content of the account by the media device based on the received account information and the usage term.

A method for controlling personal content on a media device via a mobile user device includes (but is not limited to) any one or combination of: (i) establishing, at the mobile user device, a wireless connection with the media device; (ii) providing account information for an account associated with personal content to the media device, the personal content of the account accessible by the media device from a server computer over a communication network or from a memory of the media device; and (iii) providing, to the media device, a usage term for accessing or using the personal content of the account. The usage term specifies at least one rule for accessing or using the personal content of the account. Access to or usage of the personal content of the account by the media device is controlled based on the provided account information and the usage term.

In various implementations, the method further includes terminating the wireless connection.

In various implementations, the media device is one of a television, a digital video recorder, a video game system, an optical disc player, a media player for playing media on a television, and a smart TV module.

In various implementations, the mobile user device is one of a cell phone, a tablet, and a personal digital assistant.

DETAILED DESCRIPTION

Various implementations are directed toward a personal or mobile device owned or used mostly by a single user that contains user account information for accessing personal content or the like along with usage permissions, such as only allowing access to personal content of certain accounts or allowing certain applications to access personal content of accounts. The personal device is configured to cooperate with a shared media device that is generally used by multiple users to provide the shared media device with the information to allow the shared media device to access the Internet content based on the information provided by the personal device.

Figure 1:
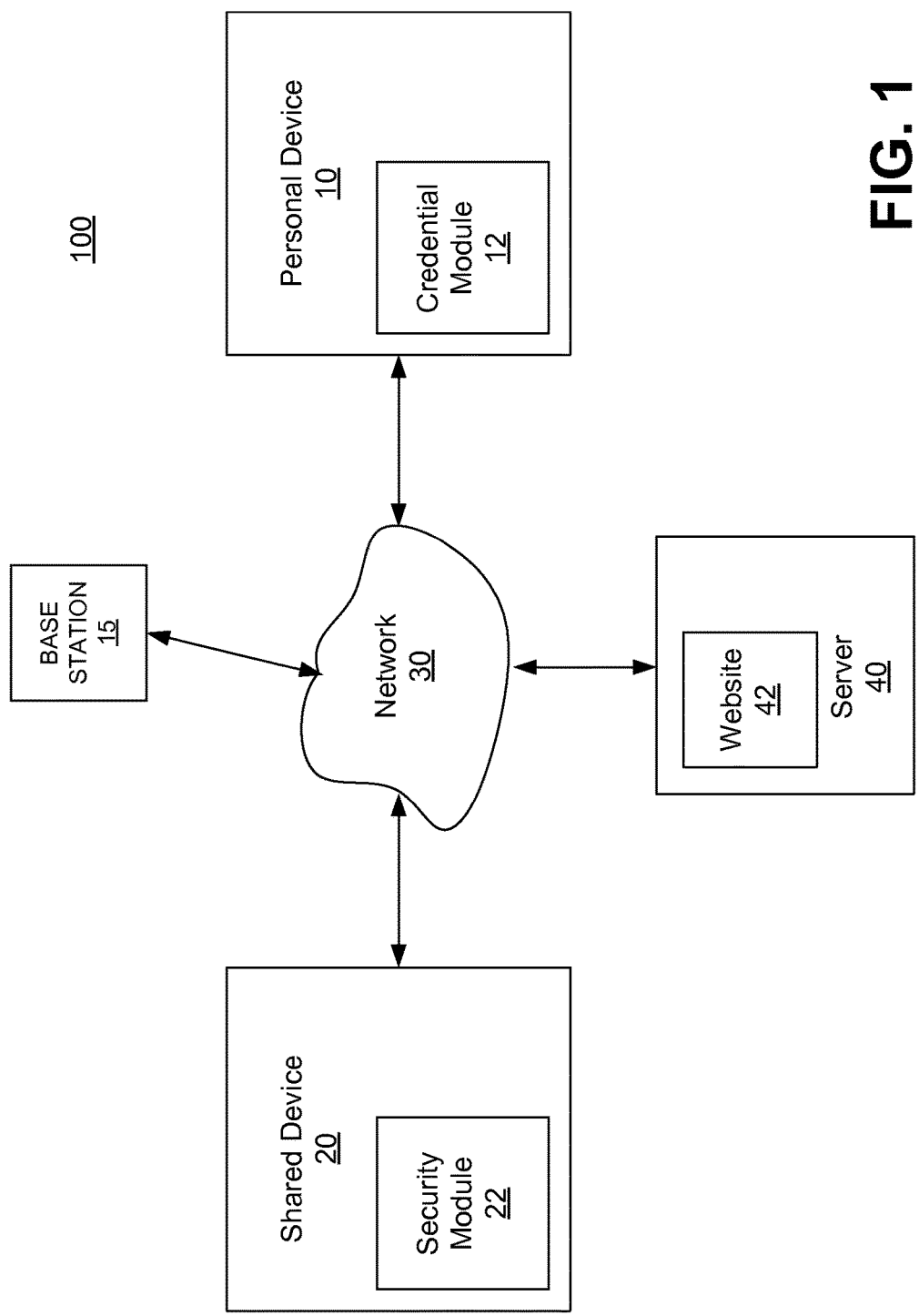
FIG. 1 is an illustrative network environment according to various implementations of the disclosure.

FIG. 1 is an illustrative network environment 100 including a personal device 10 and a shared media device 20. The personal device 10 and the shared media device 20 are configured to transmit and/or receive data and information over a wireless communication interface (e.g., network 30). Coupled with the network 30 are one or more servers illustrated by server 40. In various implementations, a website 42 may reside on the server 40. The network 30 may represent one or both of local area networks (LAN) and wide area networks (WAN) and/or any other network environment. In particular implementations, the shared media device 20 may be coupled to the server 40 via a WAN (e.g., Internet), the shared media device 20 may be coupled to the personal device 10 directly or through a base station 15, such as a hub or router, via a LAN. The base station 15 may be coupled to the server 40 via a WAN or a router or the like that can communicate with the server 40.

The personal device 10 may be, but is not limited to, a mobile phone (e.g., a smart phone), a tablet computer, a personal computer, a laptop computer, a personal digital assistant (PDA), a video (or other media) player, another consumer electronic device, and/or the like. The terms personal device and mobile user device may be used interchangeably throughout the disclosure unless otherwise specified. The shared media device 20 can be, but is not limited to, a set-top box, a smart TV, a disk player (e.g., Blu-Ray, high-definition digital versatile disc (HD-DVD), a digital versatile disc (DVD), a digital video recorder (DVR), a video game system, or another computing device.

In various implementations, the shared media device 20 is or includes a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device.

A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content that is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user.

A companion application to the smart television module may be operable on the personal device 10 or other mobile computing device to provide additional information about available programs to a user, to allow the user to control the smart television module, etc. In alternate implementations, the features described herein may be implemented on a laptop computer or other personal computer, a smartphone, other mobile phone, handheld computer, a tablet PC, or other computing device.

In various implementations, the shared media device 20 includes a security module 22. In some implementations, the security module 22 may include an account manager module and an external user module. The account manager module may be configured to perform several functions (for instance, as detailed in the disclosure) including, but not limited to, managing a list of accounts and their private data (i.e., account information for accessing an account), managing access rights of applications for local or all accounts (e.g., presenting GUI to grant access rights), generating and providing authorization tokens to applications for local or all accounts and/or requesting authorization token generation from the personal device 10 for external accounts, and/or the like. It should be noted that the terms authorization and authentication may be used interchangeably unless otherwise specified.

The external user manager module may be configured to perform several functions (for instance, as detailed in the disclosure) including, but not limited to, managing a list of connected personal devices 10 and accounts associated with them, providing accounts and optionally their previously stored private data from the personal device 10 to the account manager module of the shared media device 20, providing initial accounts access rights to the account manager module of the shared media device 20, updating accounts with changes to private data and/or changes to access rights to the personal device 10 for storage (e.g., in case the account manager module of the shared media device 20 manages them), removing accounts from the account manager module of the shared media device 20 when the personal device 10 is disconnected from the shared media device 20, and/or the like. In other implementations, the account manager module and the external user module may be one module. In yet other implementations, one or more of the account manager module and the external user module may be separate from the security module 22.

In various implementations, the personal device 10 includes a credential module 12. In some implementations, the credential module 12 may be or may include an account manager module configured to perform several functions (for instance, as detailed in the disclosure) including, but not limited to, managing a list of accounts to share with the shared media device 20, managing and/or storing private data and access rights of accounts for each shared media device 20 (e.g., presenting GUI to grant access rights), providing accounts to the shared media device 20, generating and providing authorization tokens to the shared media device 20, and/or the like.

Figure 2:
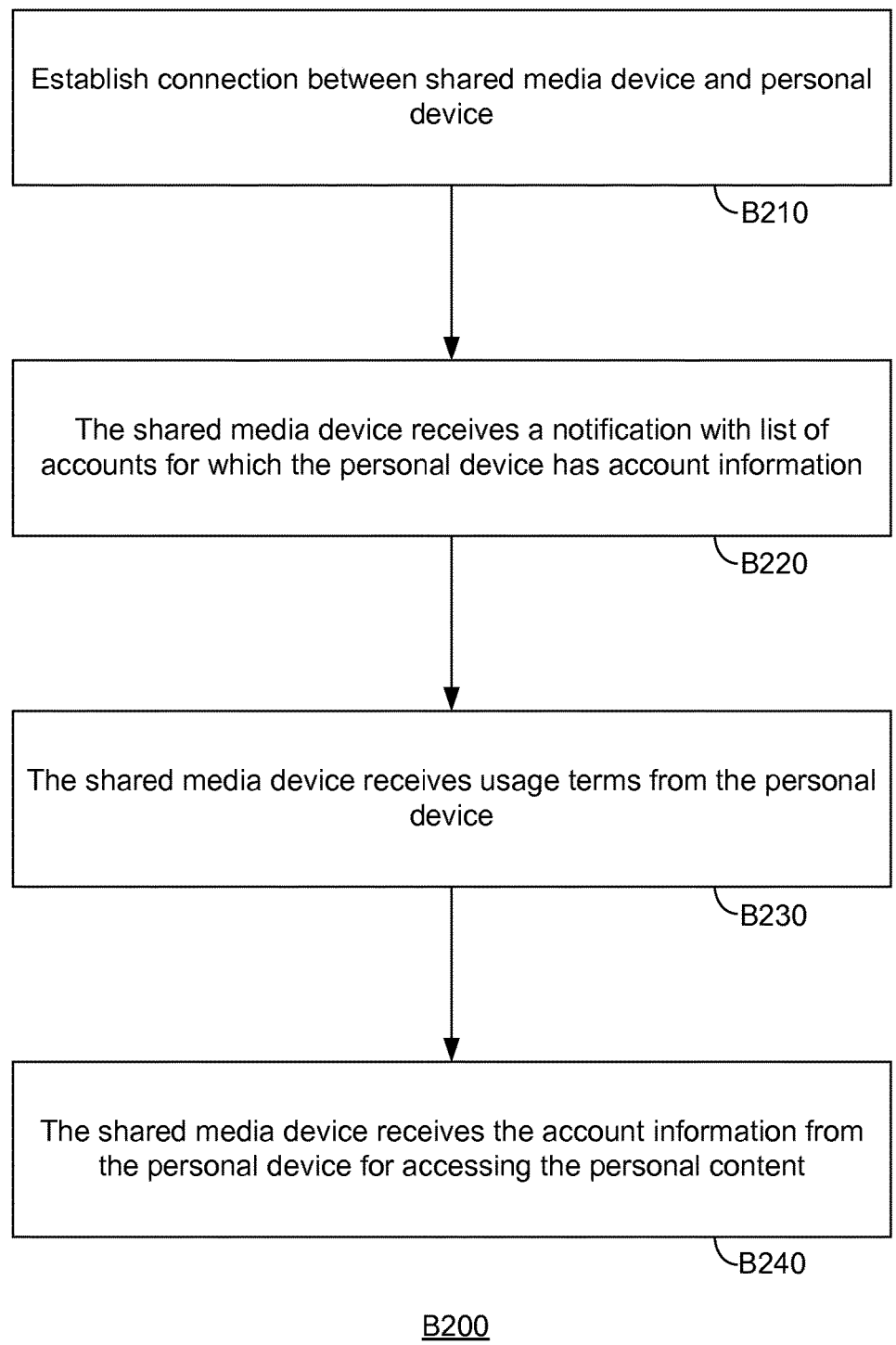
FIG. 2 illustrates a content access control method according to various implementations of the disclosure.

FIG. 2 illustrates a personal content access control method B200 according to various implementations of the disclosure. With reference to FIGS. 1 and 2, at block B210, the shared media device 20 establishes a connection with the personal device 10 over the network 30. In some implementations, the connection is a direct connection (e.g., infrared, Bluetooth, Wi-Fi, or the like) between the shared media device 20 and the personal device 10. In other implementations, the connection is though a local access point, such as the base station 15 (e.g., router) or the like. In yet other implementations, the connection is through a server connected via a WAN. In some implementations, the personal device 10 may add the shared media device 20 to a list of connected devices. The shared media device 20 may add the personal device 10 to the external user manager module, which may be part of the security module 22, of the shared media device 20.

At block B220, the security module 22 of the shared media device 20 receives a notification that account information for accessing personal content may be received (or is otherwise available) from the credential module 12 of the personal device 10. In some implementations, the security module 22 may receive a list of a plurality of personal content accounts available from the personal device 10. In particular implementations, new or updated personal content account entries are merged or synchronized with a list stored on the shared media device 20. In some implementations, the user, via the personal device 10 (or the shared media device 20), may define which personal content accounts will be made available for the shared media device 20. In some implementations, the list is received in response to establishing the connection, at a defined interval (e.g., daily, weekly, monthly, etc.), and/or in response to a predetermined event (e.g., the user initiating the list transmittal, for instance from the personal 10 device or the shared media device 20, to the shared media device 20).

At block B230, the shared media device 20 receives from the personal device 10 usage terms for controlling access to and/or usage of the personal content of the accounts. According to various implementations, usage terms includes one or more rules that determine, define, limit, or otherwise control access to and/or usage of the personal content of the accounts. Usage terms may include, but are not limited to, duration for allowing access to the personal content, to which specific personal content to allow access, to which specific personal content not to allow access, to which applications on the shared media device 20 can access the personal content, to which types of smart media devices to allow access, when (or when not to) allow access, restrictions on usage of the personal content (e.g., cannot be copied, shared by others, etc.), instructions for certain circumstances (e.g., invalidate access if the connection between the personal device 10 and the shared media device 20 is broken), and/or the like. In some implementations, the personal device 10 prompts the user to define the usage terms or accept the usage terms proposed by the shared media device 20 (or the personal device 10). Accordingly, the defined usage terms or a confirmation that the proposed usage terms have been accepted may be received from the personal device 10 to the shared media device 20.

At block B240, the shared media device 20 receives from the personal device the account information (also referred to as private data) for accessing the personal content (or at least a portion of the personal content, for instance, as determined by a usage term) of the account. The account information may include, but is not limited to, account/login/username (e.g., john@gmail.com), internal account identifier or account number (e.g., 234278192, password (e.g., mylittlesecret5432), PIN to grant short-term access to the account (e.g., 3210), authentication tokens, vendor-specific data, or any type of personal data and/or authentication information, one or more of which may be encrypted. An authentication token may be a random-like string used to authenticate requests to the server hosting the account (e.g., sda123s3dk23asg5h27zg). In some implementations, the token is generated by the server during the login phase (e.g., in response to a request by the personal device 10) and typically have a limited lifetime (e.g., days, weeks, months) but during that time, the device attempting to login does not need to store/request a password. Once the authentication token is expired, the authentication token needs to be renewed. For instance, the user may be prompted for the password or a stored password may be used. In other implementations, tokens have any suitable vendor-specified behavior or the like.

Accordingly, with the account information received from the personal device 10, the shared media device 20 can access the personal content based on the usage terms. In particular implementations, the shared media device 20 controls access to and/or usage of the personal content based on the usage terms. For instance, the shared media device 20 may prevent any non-approved applications or users from accessing the personal content. In some implementations, the usage terms may be received by the shared media device 20 substantially simultaneous with (e.g., during a same communication transmission or session) or after the account information is received by the shared media device 20. In some implementations, new usage terms may be received from the personal device 10 to update the usage terms previously received from the personal device 10.

Thus according to various implementations, upon or as part of a process for establishing a connection with the personal device 10 and the shared media device 20, the shared media device 20 may request from the personal device 10 a list of accounts that the personal device 10 may share with the shared media device 20. In response, the personal device 10 may send the list of accounts to be shared to the shared media device 20. For each account obtained, the shared media device 20 may request from the personal device 10 additional data attached to the account (e.g., access rights, usage terms, password, etc.). If the shared media device 20 is to be responsible for access rights management, then the personal device 10 returns private data required to get access to the account (e.g., password), other private data specific for the shared media device 20 (previously stored, if any), access rights for the shared media device 20 (also previously stored, if any). The shared media device 20 then adds the account to an account manager module, which may be part of the security module 22, together with additional data for this account, if any has been provided by the personal device 10. The shared media device 20 may also store the list of accounts added to the account manager from the personal device 10 for future access.

In various implementations, the shared media device 20 and/or the personal device 10 are configured to control access by an application of the shared media device 20 to an account of the personal device 10. For instance, if account data (on the shared media device 20) allows access rights management and is enough for authorization (e.g., to have an authorization token generated), but the application has not been granted rights to use the account, a graphical user interface (GUI) may be displayed requesting access rights, in response to which the system may receive credentials from a user. This GUI may be created on the shared media device 20 and/or the personal device 10 to receive the credentials from the user. If account data (on the shared media device 20) allows access rights management and is enough for authorization (e.g., to have an authorization token generated) and the application has been granted rights to use the account (previously and/or through the GUI requesting access), the application is granted access to the account (e.g., by having an authorization token generated).

If access rights management is not possible or there is no data required for authorization, a request may be directed to the personal device 10. Accordingly, if the application of the shared media device 20 has not yet been granted rights to use the account, a GUI may be created (e.g., displayed) on the shared media device 20 and/or the personal device 10 with a request to grant or deny such rights. If the application of the shared media device 20 has been granted rights to use the account (e.g., previously or through the grant access GUI), the personal device 10 may provide the shared media device 20 access to the account (e.g., by generating and sending an authorization token to the shared media device 20). The shared media device 20 then provides the data result (e.g., authorization token) obtained from the personal device 10.

In some implementations, the GUI for requesting access may include two windows—one displayed on the shared media device 20, the other one displayed on the personal device 10. The GUI may display (but is not limited to) information about which application is trying to gain access to which account (on one or both devices); information that the personal device 10 can be used to grant access on the shared media device 20; an option to deny access (on one or both devices) temporarily/forever; an option to grant access according to a of usage terms (on personal device 10) temporarily/forever; and/or the like. In particular implementations, one of the devices 10, 20 initiates the creation of the GUI. Selecting an option on one of the devices 10, 20 that changes access rights will result in modifying access rights on the device the has initiated the GUI creation and closing the GUI (on both devices). If access rights are modified on the shared media device 20 (and initiated the GUI), the access rights change is forwarded to the personal device 10, so the changed access rights can be stored for later usage.

In various implementations, the personal device 10 can provide additional instructions at any time. For instance, the personal device 10 can terminate access to the personal content at anytime (e.g., invalidating authentication token, requesting the shared media device 20 to delete the received account information, etc.). In various implementations, upon disconnecting the personal device 10 from the shared media device 20 additional processes may be performed. For instance, if the personal device 10 had generated any authorization tokens, the tokens may be invalidated by the personal device 10. The personal device 10 may remove the shared media device 20 from the list of connected devices. The shared media device 20 may remove the personal device 10 from the external user manager module. The shared media device 20 may obtain (e.g., stored when adding the personal device 10) a list of accounts assigned to the personal device 10 to remove those accounts from the account manager. The shared media device 20 may invalidate an authorization tokens for these accounts.

Throughout various implementations, personal content to which access may be controlled may include (but is not limited to) emails, SMS messages, social network content, media content (e.g., images, photos, videos, audio files, etc.), documents (e.g., spreadsheets, slideshow presentations, etc.), video game files (e.g., save information), sensitive information (e.g., banking data, medical data, etc.), and/or type of information or data that may require authentication or authorization for access. Throughout various implementations, the personal content can be accessed through (but not limited to) a website (located on a server), a content server (e.g., media server), a database server, and/or the like. In various implementations the personal content is content that may also be accessible and usable (e.g., viewable, playable, displayable, etc.) on the personal device 10 and/or other devices that are not providing the account information to the shared media device 20. Thus in various implementations, the personal content accessed on the shared media device 20 need not be a type of content that can only be accessed on the shared media device 20.

Illustrative Implementations

Alice and Bob are married and have a fourteen-year-old son, Charlie. Each of them has their own smart phone that contains personal information.

Charlie wants to show some of his online photos to his parents without giving them his account information for accessing the online photos. He may use his smart phone (personal device) to provide access to his online photos on the family television (shared device or connected to the shared device). He can also designate (provide usage terms) to allow access to photos in his school trip photo album and that access is valid for up to one hour. Accordingly, his parents are able to view only the photos in his school trip album and not any other photos of Charlie for which Charlie did not provide access through his smart phone. In addition, as defined in the usage terms, if not terminated sooner (e.g., Charlie manually requests access be terminated, the access to the photos may also terminate in one hour automatically such that the photos could not be accessed later without Charlie's authorization (e.g., by repeating the authorization above).

Bob enjoys using a social network while watching television programs on the television (shared media device or otherwise associated with a shared media device) to share his thoughts with friends, have live notifications on the television, and/or the like. He prefers not to remain logged in on the television (e.g., Charlie may secretly use his account, Alice may learn of a gift Bob bought for Alice, etc.). Accordingly, Bob may use his smart phone to login on the television to the social network with minimal operation of the phone (e.g., one or two clicks or the like) when he is watching television and log out when he is done watching television. For instance, Bob may have set usage terms to invalidate his authorization (e.g., log out) after a period of time (e.g., three hours) of logging in or inactivity, when the television (or other device) is turned off (e.g., indicating that he is done watching television), for television (or media) content that Bob has not pre-approved (e.g., authorization allowed for sports programming; authorization not allowed for reality television programming; etc.), and/or the like.

Alice visits her brother, Dave, to show him some photos. She may user her smart phone to pass a temporary authorization (access) to Dave's smart television module to provide access for a particular photo application of the smart television module only (as opposed to other applications of the smart television module) and invalidates the access as soon as she leaves. For instance, Alice may manually invalidate access or set her usage terms such that the access is invalidated when the connection between her smart phone and the smart television module is broken, for instance, when the devices are no longer in range to communicate with each other upon Alice leaving Dave's home.

Figure 3:
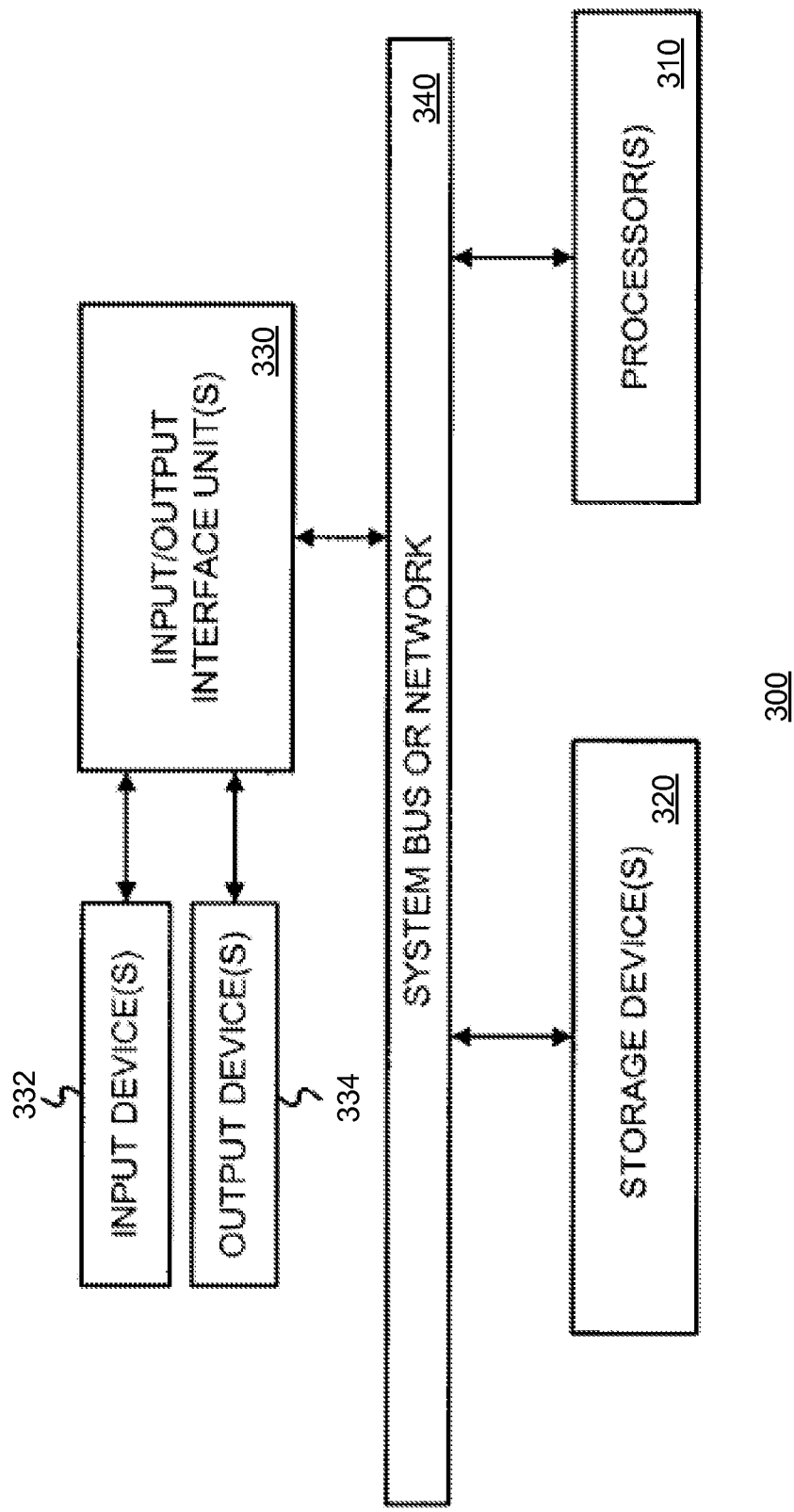
FIG. 3 is a block diagram of a shared media device according to various implementations of the disclosure.

FIG. 3 is a block diagram illustrating a shared media device (e.g., 20 in FIG. 1) that can be used to perform at least some of the various operations described in the disclosure. With reference to FIGS. 1-3, the shared media device 20 includes an address/data bus 340 for communicating information between one or more of the components of the shared media device 20. A processor 310 is coupled with the bus 340 for processing information and instructions. The components may be configured to communicate with each other using interfaces such as (but not limited to) one or more universal serial bus (USB) interfaces, micro-USB interfaces, universal asynchronous receiver-transmitter (UART) interfaces, general purpose input/output (GPIO) interfaces (e.g., inter-integrated circuit (i2C)), control/status lines, control/data lines, shared memory, and/or the like.

The processor 310 may be responsible for executing various software programs such as application programs and system programs to provide computing and processing operations for the shared media device 20. The processor 310 may be responsible for performing various voice and data communications operations for the shared media device 20 such as transmitting and receiving voice and data information over one or more wireless communications channels.

The shared media device 20 includes a storage device 320 that can include any suitable type of storage including, for example, a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or any other type of storage medium. The shared media device 20 may include volatile memory (e.g., random access memory, RAM) coupled with the bus 340 for storing information and instructions for the processor 310 and/or a non-volatile memory (e.g., read only memory, ROM) coupled with the bus 340 for storing static information and instructions for the processor 310. In other implementations, memory may be implemented using any machine-readable or computer-readable media capable of storing data such as (but not limited to) volatile memory or non-volatile memory, removable or nonremovable memory, erasable or non-erasable memory, writeable or re-writeable memory, and/or the like. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information. In some implementations, a PC board or the like can contain, for example, the processor 310, the bus 340, the RAM, the ROM, and/or the like.

Although the memory may be shown as being separate from the processor 310 for purposes of illustration, in various implementations, some portion or the entire memory may be included on the same integrated circuit as the processor 310. Alternatively, some portion or the entire memory may be disposed on an integrated circuit or other medium (e.g., hard disk drive) external to the integrated circuit of the processor 310. In various implementations, the shared media device 20 may comprise an expansion slot (not shown) to support a multimedia and/or memory card, for example.

In various implementations, the shared media device 20 may comprise an input/output (I/O) interface 330 coupled to the processor 310. The I/O interface 330 may comprise one or more I/O devices such as (but not limited to) a serial connection port, an infrared port, integrated Bluetooth® wireless capability, integrated 802.11x (WiFi) wireless capability, and/or the like to enable wired (e.g., USB cable) and/or wireless connection to a local device, such as the personal device 10, a base station, a personal computer (PC), and/or the like. In various implementations, the shared media device 20 may be configured to transfer and/or synchronize information with the personal device 10. For instance, the personal device 10 may be used as an input device 332 (or communicate with the input put device 332) to provide commands and information (e.g., as entered by a user of the personal device 10) to the shared media device 20, program the shared media device 20 (e.g., set preferences), and/or the like. Some non-limiting examples of input devices 332 for providing data to the shared media device 20 (e.g., directly to the shared media device 20 or via the personal device 10) include, but are not limited to, a keyboards, a pointing device (e.g., a mouse), a microphone, a touch input interface, a joystick, a game pad, a satellite dish, a scanner, and/or the like. An output device 334 may include (but is not limited to) a monitor or other types of display devices, which can be connected to the bus 340 via an appropriate interface. In addition (or instead of) the monitor, the user terminal may include other (peripheral) output devices (not shown), such as speakers and printers for example. In some cases, the output device 334 can include a component for providing one or more of a visual output, a haptic output, or an audio output.

In various implementations the shared media device 20 also includes a communication module that may be part of (or otherwise associated with) the I/O interface 330. The communication module may comprise one or more transceivers configured to communicate using different types of protocols, communication ranges, operating power requirements, RF sub-bands, information types (e.g., voice or data), use scenarios, applications, and/or the like. In various implementations, the communication module may comprise one or more transceivers configured to support communication with local devices (e.g., personal device 10, base station, server, and/or the like) using any number or combination of communication standards.

In various implementations, the communication module can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). Power for the communication module 230 may be supplied by the battery cells 210.

In various implementations, the communication module may comprise one or more transceivers configured to perform data communications in accordance with one or more wireless communications protocols such as (but not limited to) WLAN protocols (e.g., IEEE 802.11 a/b/g/n, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communication module may be coupled to the bus 340 for providing a communication link between the shared media device 20 and the network 30. As such, the communication module enables the processor 310 to communicate wirelessly with other electronic systems coupled to the network 30. For instance, the communication module may be coupled to an antenna (not shown) and provides functionality to transmit and receive information over a wireless communication interface.

As such, in various implementations, the communication module is for communicating with a remote device. For instance, in some implementations, the communication module is for communicating with a remote device, such as the server (having a website), via the network 30. In some implementations, the communication module is for communicating directly with a base station (e.g., hub, router, etc.) or other local device (e.g., personal device).

The communication module may be implemented using one or more chips as desired for a given implementation. In some implementations, the communication module may be separate from and external to the processor 310. In various implementations, some portion or the entire communication module may be included on the same integrated circuit as the processor 310.

In some implementations, the shared media device 20 may include an antenna system (not shown) for transmitting and/or receiving electrical signals using WWAN protocols, WLAN protocols, and/or the like. For instance, the antenna system may be coupled to the processor 310 through the communication module. The antenna system may comprise or be implemented as one or more internal antennas and/or external antennas.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method for controlling access to personal content by a media device, the method comprising:
    establishing, using a hardware processor of a mobile device, a connection with the media device;
    in response to establishing the connection with the media device, sending account information identifying a plurality of accounts from a list of accounts to be shared with the media device;
    receiving a request from the media device for access to a first account associated with personal content of the plurality of accounts;
    in response to the request for access to the first account, sending an authorization token to be used by the media device to access the first account;
    prompting a user to set usage terms for accessing the personal content of the first account, wherein the usage terms specify a rule indicating that upon the mobile user device being disconnected from the media device the media device is to inhibit at least a portion of the personal content associated with the account from being presented;
    sending the usage terms for accessing the personal content of the first account to the media device;
    receiving user input indicating that access to the personal content of the first account is to be inhibited; and
    in response to the user input indicating that access to the personal content of the first account is to be inhibited, invalidating the authentication token.

2. The method of claim 1, wherein the connection with the media device is made using a local area network.

3. The method of claim 1, wherein the connection with the media device is made using a direct connection to the media device.

4. The method of claim 1, further comprising generating the authorization token using the hardware processor of the mobile device.

5. The method of claim 1, further comprising receiving the authorization token from a remote server.

6. The method of claim 1, further comprising:
    receiving a request from the media device for access to a second account associated with personal content of the plurality of accounts;
    in response to the request for access to the second account, presenting a graphical user interface that prompts the user to enter credentials for accessing the second account;
    receiving an authorization token for accessing the second account from a remote server subsequent to submitting the credentials; and
    sending the authorization token for accessing the second account to the media device to be used by the media device to access the second account.

7. The method of claim 1, wherein the usage terms are sent substantially simultaneously with the account information identifying the plurality of accounts.

8. A system for controlling access to personal content by a media device, the system comprising:
    a hardware processor of a mobile device that is configured to:
        establish a connection with the media device;
        in response to establishing the connection with the media device, send account information identifying a plurality of accounts from a list of accounts to be shared with the media device;
        receive a request from the media device for access to a first account associated with personal content of the plurality of accounts;
        in response to the request for access to the first account, send an authorization token to be used by the media device to access the first account;
        prompt a user to set usage terms for accessing the personal content of the first account, wherein the usage terms specify a rule indicating that upon the mobile user device being disconnected from the media device the media device is to inhibit at least a portion of the personal content associated with the account from being presented;
        send the usage terms for accessing the personal content of the first account to the media device;
        receive user input indicating that access to the personal content of the first account is to be inhibited; and
        in response to the user input indicating that access to the personal content of the first account is to be inhibited, invalidate the authentication token.

9. The system of claim 8, wherein the connection with the media device is made using a local area network.

10. The system of claim 8, wherein the connection with the media device is made using a direct connection to the media device.

11. The system of claim 8, wherein the hardware processor is further configured to generate the authorization token.

12. The system of claim 8, wherein the hardware processor is further configured to receive the authorization token from a remote server.

13. The system of claim 8, wherein the hardware processor is further configured to:
 receive a request from the media device for access to a second account associated with personal content of the plurality of accounts;
 in response to the request for access to the second account, present a graphical user interface that prompts the user to enter credentials for accessing the second account;
 receive an authorization token for accessing the second account from a remote server subsequent to submitting the credentials; and
 send the authorization token for accessing the second account to the media device to be used by the media device to access the second account.

14. The system of claim 8, wherein the usage terms are sent substantially simultaneously with the account information identifying the plurality of accounts.

15. A computer program product for controlling personal content on a media device, the computer program product comprising:
 a non-transitory computer-readable medium comprising code for:
  establishing a connection with the media device;
  in response to establishing the connection with the media device, sending account information identifying a plurality of accounts from a list of accounts to be shared with the media device;
  receiving a request from the media device for access to a first account associated with personal content of the plurality of accounts;
  in response to the request for access to the first account, sending an authorization token to be used by the media device to access the first account;
  prompting a user to set usage terms for accessing the personal content of the first account, wherein the usage terms specify a rule indicating that upon the mobile user device being disconnected from the media device the media device is to inhibit at least a portion of the personal content associated with the account from being presented;
  sending the usage terms for accessing the personal content of the first account to the media device;
  receiving user input indicating that access to the personal content of the first account is to be inhibited; and
  in response to the user input indicating that access to the personal content of the first account is to be inhibited, invalidating the authentication token.

16. The computer program product of claim 15, wherein the connection with the media device is made using a local area network.

17. The computer program product of claim 15, wherein the connection with the media device is made using a direct connection to the media device.

18. The computer program product of claim 15, further comprising code for generating the authorization token using the hardware processor of the mobile device.

19. The computer program product of claim 15, further comprising code for receiving the authorization token from a remote server.

20. The computer program product of claim 15, further comprising code for:
 receiving a request from the media device for access to a second account associated with personal content of the plurality of accounts;
 in response to the request for access to the second account, presenting a graphical user interface that prompts the user to enter credentials for accessing the second account;
 receiving an authorization token for accessing the second account from a remote server subsequent to submitting the credentials; and
 sending the authorization token for accessing the second account to the media device to be used by the media device to access the second account.

21. The computer program product of claim 15, wherein the usage terms are sent substantially simultaneously with the account information identifying a plurality of accounts.

* * * * *